3,003,757
COOLING OF CEMENT CLINKER
David W. Mitchell, Shelby, N.C., assignor to The Oil Shale Corporation, Beverly Hills, Calif., a corporation of Nevada
Filed May 5, 1958, Ser. No. 733,156
4 Claims. (Cl. 263—53)

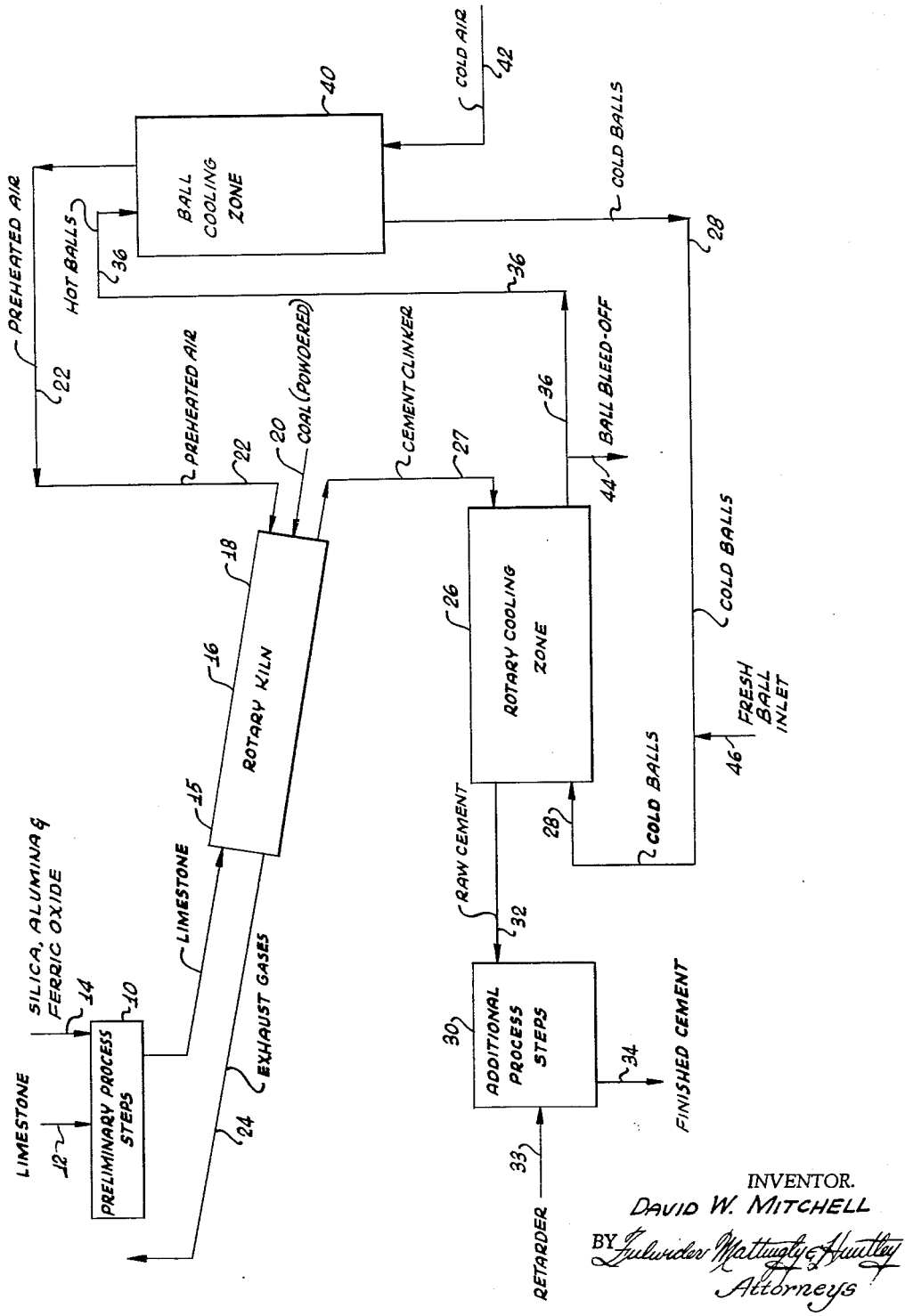

This invention relates to the manufacture of cement and relates especially to improvements in the cooling of the cement clinker formed during the roasting step of the process.

The cooling of the cement clinker is an extremely important step in the manufacture of cement. It is during the cooling of the clinker that the cement compounds crystallize out, the rate of cooling having been found to have a profound effect on the ultimate physical properties of the cement. Because the cooling rate has such an important bearing on the ultimate properties of the cement, control at this stage is, of course, extremely important.

In the prior art, the conventional cooler comprises a rotary steel shell or drum fitted with internal baffle means which lift the cement clinker and pass it through a draft of cold air. Other types of coolers have, of course, also been proposed. Usually, however, the cooling of the cement clinker is accomplished by passing a stream of cool air therethrough. The use of air as a cooling medium has several important drawbacks. First, the heat capacity of air, or of any gas, is very low when compared with solids. Consequently, large volumes of hot gas must be employed. The cooling equipment is usually large and expensive, and dusting, and losses of materials thereby are all problems inherent in this type of cooling. Further, precision control of the temperature within the cooling zone is generally difficult because of the inherent difficulty of accurately controlling large volumes of gas.

The above disadvantages are substantially overcome by the use of cool solid bodies of high heat capacity in place of a cool gas stream.

Bearing in mind the foregoing facts, it is a major object of the present invention to provide a process for the manufacture of cement wherein the rate of cooling of the cement clinker may be accurately controlled in a relatively simple and relatively inexpensive manner.

Another object of the present invention is to provide a process for the manufacture of cement wherein the rate of cooling of the cement clinker may be accurately controlled in an improved manner and without any appreciable cement losses as by dusting.

A further object of the invention is to provide a process for the manufacture of cement wherein the rate of cooling of the cement clinker may be accurately controlled by the admixture of solid cooling bodies with the cement clinker, these bodies, in addition to their cooling function, having a grinding and crushing action on the cement clinker.

These and other objects of the invention will become more clearly understood by reference to the following description, and to the accompanying drawing which is a flow sheet of one preferred form of the process.

In general, in the manufacture of cement, a substance containing lime (usually limestone), is subjected to preliminary process steps, such as being crushed and ground to a fine powder. The pulverized limestone is mixed with a usually smaller proportion of pulverized silica, alumina and ferric oxide. Water is added forming a wet slurry of all the above cementitious ingredients and the slurry is thickened.

The slurry is then sent to a rotary kiln for the roasting operation. In many processes, a slurry is not formed, the dry mixture itself being roasted. During the roasting operation, any water present is driven off, organic matter is burned away, and carbon dioxide is liberated from the carbonates. An interreaction between the free calcium oxide and the other remaining compounds takes place, the cement compounds being thereby produced—in the form of clinker. The heat for the roasting operation is usually furnished by the combustion of a fuel such as coal, with air.

The hot cement clinker is then sent to the cooling zone, the value of the product as cement depending, in a great measure, on the type and amount of cement compounds crystallizing out during the cooling phase. According to my invention, the cooling of the hot clinker is accomplished by admixing cool heat-resistant and wear-resistant solid bodies with the hot clinker in a rotary kiln. The bodies are then separated from the clinker, after a predetermined length of time, and are cooled by air, the air being thereby pre-heated and later used for combustion purposes. Upon being cooled, the solid bodies are returned to the cooling zone for cooling of newly-formed hot cement clinker.

The cooled cement clinker is then sent to additional process steps, such as the adding of a retarder (e.g. gypsum), and the crushing and grinding of the mixture to a fine powder. The retarder is added to prevent too rapid a stiffening of the cement paste when made into mortar or concrete.

Referring now especially to the figure, limestone is sent to one or more preliminary steps 10 along line 12, silica, alumina, ferric oxide, and possibly other ingredients being added along line 14. The preliminary steps include a crushing and grinding of the above cementitious ingredients and perhaps the addition of water if the cement is to be made by the wet process.

The wet slurry or dry mixture is fed to the upper end 15 of a slightly inclined rotary kiln 16 and is passed downwardly and countercurrently to a stream of hot gases. In the upper section of the kiln 16, water is driven off, the organic matter is burned away, and carbon dioxide is driven off during the decomposition of the carbonates. Free calcium oxide is thus formed. An increasing amount of free calcium oxide is produced as the charge passes downwardly through the kiln 16, until such time as the charge reaches the hottest zone of the kiln, the hottest zone being located in the lowermost section 18 of the kiln 16.

The hottest zone 18 is maintained at a temperature of 1300°–1500° C., the point of incipient fusion of the cement ingredients, by means of the combustion of a fuel, such as oil or powdered coal with preheated air. The fuel, coal, and air enter the kiln 16 along the lines 20 and 22 respectively, the exhaust gases leaving along the line 24.

In the hottest region 18, the cement ingredients partially fuse and reaction between the free calcium oxide and the silica, alumina, ferric oxide, etc., commences, the cement compounds, e.g. dicalcium silicate, tricalcium aluminate, being formed as a clinker. When the clinker is discharged, the free calcium oxide is usually under 1%. The clinker is discharged from the lower end of the kiln, at a temperature of between approximately 1300°–1500° C., as a hard granular mass varying in size from one-eighth to three-quarters of an inch. The clinker is sent to the rotary cooling zone 26 via line 27 where it is admixed with a plurality of cold heat-resistant and hard wear-resistant solid bodies of generally spherical configuration. These solid bodies are generally composed of steel, ceramic, or alumina materials, or combinations of these materials.

The cold spherical bodies or balls, entering the rotary cooling shell or zone 26 along the line 28, flow preferably countercurrently to the cement clinker stream. The cooling zone 26 rotates about a substantially horizontal axis and the material streams, each entering the cooling zone from opposite ends, are forced therethrough in intimate countercurrent contact. The hot clinker thereby gives up its heat to the colder balls under efficient heat transfer conditions. The rate of cooling of the clinker may thus be accurately controlled by controlling the rate of throughput of the balls.

The ball size is preferably somewhat larger than the inlet clinker size, e.g., one inch in diameter for an average clinker size of one-half inch. The clinker can thus be readily separated from the balls by relatively simple screening apparatus formed, for example, within the wall of the rotary cooling shell 26, the screening apparatus allowing the clinker to fall through, but not the balls.

The extremely hard wear-resistant balls exert a definite and appreciable crushing and grinding action on the clinker, in addition to their cooling effect, such preliminary crushing and grinding rendering the subsequent grinding and pulverizing step more economical.

While the foregoing description of the cooling step has referred to a countercurrent flow of clinker and ball materials, it is frequently advantageous to utilize a parallel or concurrent flow of clinker and ball streams. While the heat transfer characteristics are not as advantageous in this type of process, separation of the streams is not required within the cooling shell 26. Further, an inclined cooling zone 26 may be employed with attendant power economies.

The raw cement, after cooling, is sent to additional process steps, designated generally by the box 30, via line 32. For example, a retarder such as gypsum can be added to the raw cement along line 33, and the mixture pulverized. The finished cement leaves the process along line 34.

The balls, after passing through the zone 26, have a temperature of approximately 1250°–1450° C. In order to cool them for reuse, they are sent along line 36 to the top of a ball cooling zone or tower 40, a continuous stream of cold air entering the tower via line 42. The stream of air is blown upwardly through the downwardly moving balls to cool them to a temperature of approximately 30° C. The cooled balls are then recycled via line 28 to the cooling zone 26. Worn balls are bled from line 36, via line 44, and fresh balls added via line 46.

Air, preheated by the balls, is sent from the zone 40 directly to the rotary kiln 16 via line 22 and is combusted with coal or oil to furnish heat for the reaction of the cementitious ingredients, as previously described.

By way of example, the following numerical data is given for counterflow of steel balls and cement clinker in the cooling zone 26:

One inch steel balls enter the cooling zone 26 via line 28 at a temperature of approximately 30° C., and at a rate of 4000 lbs. per hour. Cement clinker, having a size of between one-eighth and three-quarters of an inch, enters the zone 26, via line 27, at a temperature of approximately 1300° C. and at a rate of 2000 lbs. per hour.

The cement clinker and balls pass countercurrently through the zone 26 for a period of approximately two hours, the rate of heat transferred being such as to decrease the temperature of the clinker by approximately 630° C./hour. The outlet temperature of the clinker is approximately 40° C. and the outlet temperature of the balls is approximately 1275° C. The size of the clinker is reduced somewhat by the action of the balls.

The balls are then sent, via line 36, to the ball heating tower or zone 40, where they contact an upwardly moving stream of cold air entering the zone along line 42 at ambient atmospheric temperature. The balls are thus cooled to a temperature of approximately 30° C. and recycled to the zone 26 via line 28 for contact with newly-formed cement clinker.

The rate of cooling of the cement clinker may be readily adjusted by metering the amount of balls per hour entering the zone 26. It will further be seen that no air enters the cooling zone 26, the cooling of the clinker being accomplished solely by means of the cold balls entering via line 28.

While several preferred embodiments have been described, it will be seen by those skilled in the art that changes and modifications may be made in my process which lie within the scope of my invention. For this reason, I do not intend to be limited by the foregoing description, but only by the appended claims.

I claim:

1. A process for the manufacture of cement which comprises: heating cementitious ingredients, by hot gases, to form hot cement clinker; admixing said hot cement clinker with solid cooling bodies having an initial temperature substantially lower than said hot cement clinker whereby to simultaneously grind and cool said cement clinker; separating said solid cooling bodies from said cement clinker after the cooling thereof; passing said solid bodies through cold air to thereby cool said bodies and preheat the air; recycling said solid cooling bodies for admixture with newly-formed hot cement clinker; and combusting said preheated air and fuel to furnish said hot gases for the heating of said cementitious ingredients.

2. A process for the manufacture of cement which comprises: heating cementitious ingredients, by hot gases, to form hot cement clinker; passing said hot cement clinker into a plurality of solid cooling bodies, and in intimate admixture therewith whereby to simultaneously grind and cool said cement clinker, said solid cooling bodies having an initial temperature substantially lower than said hot cement clinker; separating said solid cooling bodies from said cement clinker after the cooling thereof; passing said solid cooling bodies through cold air to thereby cool said bodies and preheat the air; recycling said solid cooling bodies for admixture with newly-formed hot cement clinker; and combusting said preheated air and fuel to furnish said hot gases for the heating of said cementitious ingredients.

3. The process of claim 2, wherein the solid bodies are of generally spherical configuration.

4. The process of claim 2, wherein the solid bodies are selected from the group consisting of steel, ceramic and alumina-containing materials.

References Cited in the file of this patent

UNITED STATES PATENTS

| | | |
|---|---|---|
| 1,728,495 | Lindhard | Sept. 17, 1929 |
| 2,055,941 | Newhouse | Sept. 29, 1936 |
| 2,332,701 | Downsett | Oct. 26, 1943 |
| 2,420,376 | Johansson | May 13, 1947 |
| 2,841,384 | Petersen | July 1, 1958 |